(12) United States Patent
Chen

(10) Patent No.: US 11,250,791 B2
(45) Date of Patent: Feb. 15, 2022

(54) METHOD AND DEVICE FOR DETECTING AMBIENT LIGHT, AND STORAGE MEDIUM

(71) Applicant: BEIJING XIAOMI MOBILE SOFTWARE CO., LTD., Beijing (CN)

(72) Inventor: Chaoxi Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/886,655

(22) Filed: May 28, 2020

(65) Prior Publication Data
US 2021/0210027 A1 Jul. 8, 2021

(30) Foreign Application Priority Data

Jan. 3, 2020 (CN) .......................... 202010006040.2

(51) Int. Cl.
G09G 3/34 (2006.01)
G09G 3/36 (2006.01)

(52) U.S. Cl.
CPC ............. *G09G 3/3406* (2013.01); *G09G 3/34* (2013.01); *G09G 3/36* (2013.01); *G09G 2320/0626* (2013.01); *G09G 2360/144* (2013.01)

(58) Field of Classification Search
CPC .............. G09G 3/3406; G09G 3/36; G09G 2320/0233; G09G 2320/0626; G09G 2320/0686; G09G 2360/144; G09G 2360/16
See application file for complete search history.

(56) References Cited

U.S. PATENT DOCUMENTS

| 7,468,722 | B2 * | 12/2008 | Ferguson ............. G09G 3/3406 345/102 |
| 7,879,631 | B2 * | 2/2011 | Hong ................ H01L 31/02164 438/29 |
| 8,223,117 | B2 * | 7/2012 | Ferguson ............. G09G 3/3406 345/102 |
| 9,622,326 | B1 | 4/2017 | Devyver et al. |
| 2010/0201275 | A1 | 8/2010 | Cok et al. |
| 2011/0096084 | A1 | 4/2011 | Hu et al. |

FOREIGN PATENT DOCUMENTS

| CN | 109238460 A | 1/2019 |
| CN | 110264978 A | 9/2019 |

OTHER PUBLICATIONS

Supplementary European Search Report in the European Application No. 20182801.9, dated Jan. 11, 2021, (11p).

* cited by examiner

*Primary Examiner* — Vijay Shankar
(74) *Attorney, Agent, or Firm* — Arch & Lake LLP

(57) ABSTRACT

A first brightness value and a second brightness value are determined. The first brightness value relates to display performed by the display during a display time window. The second brightness value relates to an off state of the display during an off time window. The display is off during the off time window. A first drop depth value is determined according to the first brightness value and the second brightness value. A second ambient brightness value is acquired by adjusting a first ambient brightness value detected by the light sensor based on a brightness adjusting model acquired under predetermined ambient light and the first drop depth value.

18 Claims, 8 Drawing Sheets

METHOD AND DEVICE FOR DETECTING AMBIENT LIGHT, AND STORAGE MEDIUM

CROSS-REFERENCE TO RELATED APPLICATIONS

This application is based on and claims priority to Chinese Application No. 202010006040.2, filed on Jan. 3, 2020, the entire content of which is hereby incorporated by reference in its entirety for all purposes.

BACKGROUND

With an increasing demand of electronic equipment for a full-screen design, there have been various designs where an off-screen device, such as an image capturing device, a sensor, etc., is arranged under a screen. However, a light sensor adapted to detecting ambient brightness, when being arranged under a screen and thus subject to interference of brightness of a display, may not be able to detect the ambient brightness accurately.

SUMMARY

Embodiments herein provide a method and device for detecting ambient light, and a storage medium.

According to an aspect herein, a method for detecting ambient light may apply to mobile User Equipment (UE). The mobile UE may include a display and a light sensor. In the method, the UE may determine a first brightness value during a display time window and a second brightness value during an off time window. The first brightness value is obtained by the light sensor in a display state of the display during the display time window. The second brightness value is obtained by the light sensor in an off state of the display during the off time window. The display is off during the off time window. The UE may determine a first drop depth value according to the first brightness value and the second brightness value. The UE may acquire a second ambient brightness value by adjusting a first ambient brightness value detected by the light sensor based on a brightness adjusting model acquired under predetermined ambient light and the first drop depth value.

According to an aspect herein, a device for detecting ambient light may apply to mobile User Equipment (UE). The mobile UE may include a display and a light sensor. The device may include at least a processor and memory. The memory may be adapted to storing an instruction executable by the processor. The processor may be adapted to executing the instruction to implement the method for detecting ambient light herein.

According to an aspect herein, a non-transitory computer-readable storage medium has stored thereon computer-executable instructions which, when executed by a processor, allow the processor to implement the method for detecting ambient light herein.

The above general description and elaboration below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1:
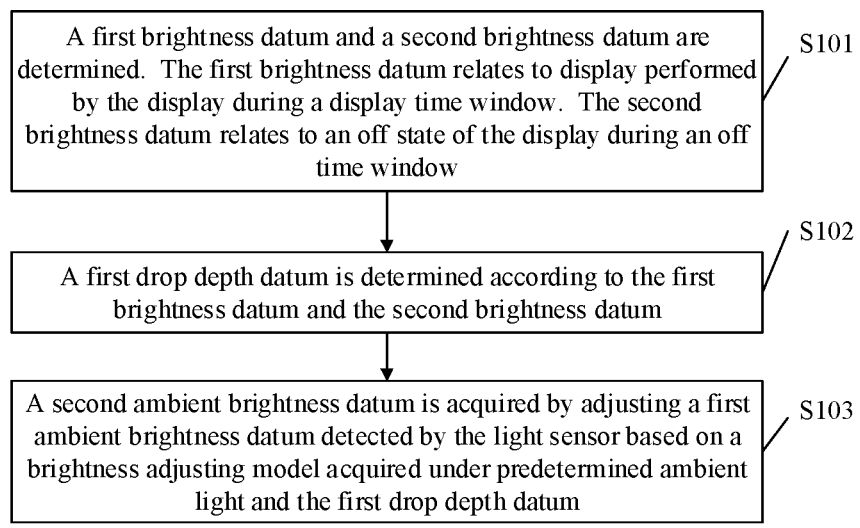
FIG. 1 is a flowchart of a method for detecting ambient light according to an example.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

FIG. 1 is a flowchart of a method for detecting ambient light according to an example. The method may apply to User Equipment (UE). The UE may include a display and a light sensor. As shown in FIG. 1, the method may include a step as follows.

In S101, a first brightness value and a second brightness value are determined. The first brightness value relates to display performed by the display during a display time window. The second brightness value relates to an off state of the display during an off time window. The off time window is a time window between two adjacent display time windows. The display is off during the off time window.

A first brightness value may be a brightness value detected by a light sensor in a display state when a display performs normal display and glows. A first brightness value may include brightness of a display. A first brightness value may include ambient brightness in the display state. A second brightness value may be a brightness value detected by a light sensor in an off state when a display is off within a time slot between two frames displayed by the display. A second brightness value may include ambient brightness. A second brightness value may include residual brightness of a display in the off state.

A display time window and an off time window may be generated in a process where a display refreshes a displayed picture repeatedly at a refreshing frequency. After being displayed within a display time window, a frame may have to be refreshed. A display may stop display during a refreshing process. Within an off time window, a pixel may darken gradually. A pixel may light up again upon a next frame. One display cycle may include at least a display time window and an off time window neighboring the display time window. According to an embodiment herein, when determining a first brightness value relating to display performed by a display during a display time window and a second brightness value relating to an off state of the display during an off time window, the display time window and the off time window may or may not be from one display cycle. When a display time window and an off time window are from different display cycles, a display may have to be at one display brightness level. That is, if a display time window and an off time window are of different display cycles, pictures displayed in the different display cycles may have to be of the same brightness.

In S102, a first drop depth value may be determined according to the first brightness value and the second brightness value.

A display may substantially stay in the same ambient light. Accordingly, a first brightness value and a second brightness value thus acquired may both include the same ambient brightness. Accordingly, it may be computed, according to a first brightness value and a second brightness value, how brightness of a display may change when the display goes off. For example, a change in brightness of a display when the display goes off may be acquired by computing a difference between a first brightness value and a second brightness value. The change may be reflected by the first drop depth value.

Display by a display may be implemented by charging a capacitor of a pixel. When displaying a picture, the greater the charging power, the brighter the display may be. Refreshing may have to be performed between two frames. Namely, a capacitor of a pixel may have to stop from being charged to discharge the capacitor, such that the pixel may darken. The pixel may light up again upon a next frame. A refreshing time may be quite short. Accordingly, a pixel may not go off completely. The pixel may not be discharged completely before being lit up again upon a next frame. Namely, there may be residual brightness. Accordingly, a display may actually have partially lowered brightness within an off time window, instead of going off completely. Hence, a drop depth may reflect such a brightness lowering.

In S103, a second ambient brightness value is acquired by adjusting a first ambient brightness value detected by the light sensor based on a brightness adjusting model acquired under predetermined ambient light and the first drop depth value.

Different levels of adjustment may have to be performed in response to different drop depth data. Accordingly, a brightness adjusting model may have to be determined corresponding to a first drop depth value. Then, a first ambient brightness value detected may be adjusted according to the brightness adjusting model.

A light sensor may be arranged under a display to detect ambient brightness. The display may display a frame with certain brightness within a display cycle. Upon a next frame, the display may perform refreshing by going off for a time window and then displaying the next frame with brightness for the next frame. The light sensor may include a set of sensors with multiple light sensing channels arranged under the display. Accordingly, the light sensor may detect the ambient brightness within the time window in which the display is off, to acquire a first ambient brightness value. The first ambient brightness value may be different from the second brightness value in some embodiments. For example, the first ambient brightness value may be obtained using a different light sensor or multiple light sensors.

However, a pixel of a display may have to be discharged when the display goes off, which may take some time. Electric charge therein may not be released completely within a time window between two frames. Accordingly, a state of zero brightness may not be achieved within an off time window. That is, a display may still have certain brightness within an off time window. Accordingly, a first ambient brightness value detected by a light sensor may still be subject to impact of brightness of a display, and thus fail to reflect true ambient brightness.

A level of lowering of brightness of a display after the display goes off may be reflected by the first drop depth value. The first drop depth value may be determined by checking a first brightness value relating to normal display by the display and a second brightness value relating to the display in an off time window. Then, o a true second ambient brightness value may be acquired by adjusting a first ambient brightness value according to the first drop depth value.

Therefore, despite that a display may not go off completely during display and a light detector may be subject to interference of brightness of the display, an accurate ambient brightness value may be acquired by adjusting data detected by the light sensor according to a predicted interference.

Accordingly, accuracy of detection by a light sensor under a screen is improved via data processing.

Figure 2:
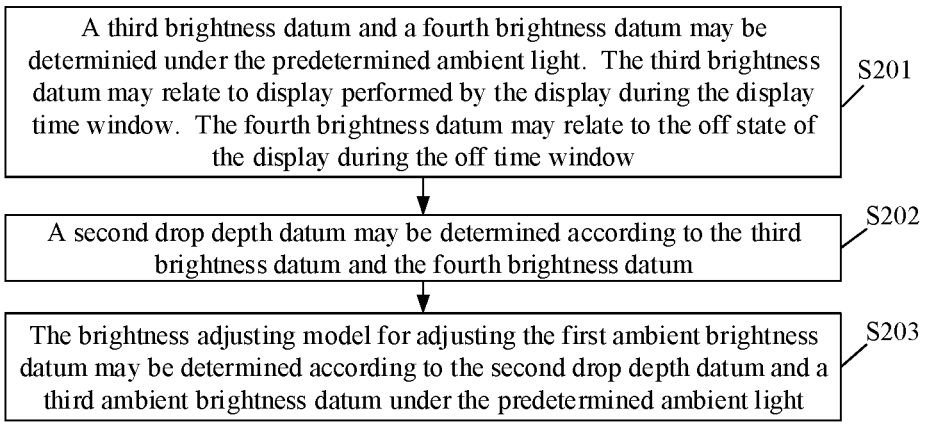
FIG. 2 is a flowchart of a method for detecting ambient light according to an example.

According to one or more embodiments herein, as shown in FIG. 2, a brightness adjusting model in S103 may be acquired under predetermined ambient light as follows.

In S201, a third brightness value and a fourth brightness value may be determined under the predetermined ambient light. The third brightness value may relate to display performed by the display during the display time window. The fourth brightness value may relate to the off state of the display during the off time window.

Residue brightness of a display in an off state may impact detection performed by a light sensor. Therefore, in actual measurement, an impact factor may have to be removed from a brightness value detected in order to acquire accurate true ambient brightness. That is, detected data may have to be adjusted according to a brightness adjusting model. Accordingly, a brightness adjusting model may first be determined under predetermined ambient light. Then, in actual detection, detected data may be adjusted according to the brightness adjusting model determined.

Ambient brightness under predetermined ambient light may be known. For example, true ambient brightness under predetermined ambient light may be measured accurately using an illuminometer in a laboratory environment. Alternatively, true ambient brightness under predetermined ambient light may be determined directly in a black box environment with virtually no ambient brightness. To simplify computation, a predetermined environment may include a black box environment.

Then, a third brightness value including brightness of a display may be determined within a display time window for displaying a frame, by detection performed by a light sensor of the display under the predetermined ambient light. Then, a fourth brightness value, including residual brightness after brightness of the display drops, may be determined within an off time window.

In S202, a second drop depth value may be determined according to the third brightness value and the fourth brightness value.

A drop of brightness of the display, i.e., the second drop depth value, may be computed according to the third brightness value and the fourth brightness value.

In S203, the brightness adjusting model for adjusting the first ambient brightness value may be determined according to the second drop depth value and a third ambient brightness value under the predetermined ambient light.

A third ambient brightness value may be determined according to known brightness of predetermined ambient light. A third ambient brightness value may be adapted to determining an error in the brightness adjusting model. Accordingly, a brightness adjusting model with a small error may be acquired by performing data fitting according to the second drop depth value and the third ambient brightness value.

With S201 through S203, a brightness adjusting model with a small error may be trained through experimental means. Different drop depth data may correspond to different brightness adjusting models. Accordingly, in actual use of a light sensor, an accurate second ambient brightness value may be acquired by adjusting a first ambient brightness value detected according to a true first drop depth value and a corresponding brightness adjusting model determined.

According to one or more embodiments herein, the display may have M display brightness levels. The M may be a positive integer.

In S201, the third brightness value and the fourth brightness value may be determined under the predetermined ambient light as follows.

An mth third brightness value and an mth fourth brightness value may be determined under the predetermined ambient light. The mth third brightness value may relate to display performed by the display at an mth display brightness level during the display time window. The mth fourth brightness value may relate to the off state of the display during the off time window after the display has performed display at the mth display brightness level. The m may be a positive integer no greater than the M.

In S202, the second drop depth value may be determined according to the third brightness value and the fourth brightness value as follows.

An mth second drop depth value may be determined according to the mth third brightness value and the mth fourth brightness value.

In S203, the brightness adjusting model for adjusting the first ambient brightness value may be determined according to the second drop depth value and the third ambient brightness value under the predetermined ambient light as follows.

The brightness adjusting model for adjusting the first ambient brightness value may be determined based on a first second drop depth value to an Mth second drop depth value, and the third ambient brightness value under the predetermined ambient light.

A display may have different average brightness at different display brightness levels. For a liquid crystal display, the brighter a backlight module is, the higher is a brightness level of a display panel. According to an embodiment herein, a basic brightness may be provided to a self-luminous Light-Emitting Diode (LED) display by Direct Current (DC) dimming. Then, display data of each pixel may be provided according to an image of a displayed picture. Accordingly, the higher a brightness level of a display is, the greater is average charging power within a capacitor of a pixel of the display when displaying a picture. Accordingly, the more residue power there is in an off time window, the higher is brightness within the off time window.

Implementation of determining a brightness adjusting model under predetermined ambient light may be provided herein. Brightness of a display may correspond to a drop depth value of the display, and further to a brightness adjusting model. Accordingly, multiple distinct second drop depth data may be computed according to different display brightness levels. Then, a corresponding brightness adjusting model may be acquired through data fitting.

According to one or more embodiments herein, in S201, the brightness adjusting model for adjusting the first ambient brightness value may be determined based on the first second drop depth value to the Mth second drop depth value, and the third ambient brightness value under the predetermined ambient light, as follows.

The brightness adjusting model may be acquired by performing data fitting on the first second drop depth value to the Mth second drop depth value, and the third ambient brightness value under the predetermined ambient light.

In S101, the second ambient brightness value may be acquired by adjusting the first ambient brightness value detected by the light sensor based on the brightness adjusting model acquired under the predetermined ambient light and the first drop depth value as follows.

An adjustment value may be acquired by inputting the first drop depth value to the brightness adjusting model.

The second ambient brightness value may be acquired by adjusting the first ambient brightness value using the adjustment value.

A brightness adjusting model may be determined as follows. A function relationship between an adjustment value for adjusting an ambient brightness value and a drop depth value, i.e., a brightness adjusting model, may be acquired by performing data fitting according to multiple sets of second drop depth data. During data fitting, a brightness adjusting model may be preset. A most accurate brightness adjusting model may be determined by comparing to a known third ambient brightness value as a reference.

Accordingly, the brightness adjusting model may be acquired by training a function using multiple sets of data. During use, an adjustment value for adjusting a first ambient brightness value detected may be acquired by inputting a current first drop depth value of a display to the brightness adjusting model. The first ambient brightness value may be adjusted based on the adjustment value. Namely, an interfering value from the display included in the first ambient brightness value may be excluded, thereby acquiring an accurate second ambient brightness value.

According to one or more embodiments herein, in S201, the brightness adjusting model may be acquired by performing data fitting on the first second drop depth value to the Mth second drop depth value, and the third ambient brightness value under the predetermined ambient light, as follows.

S alternative functions for the brightness adjusting model corresponding respectively to S fitting modes may be acquired by performing, in the S fitting modes, data fitting on at least two second drop depth data of the first second drop depth value to the Mth second drop depth value.

S outputs output by the S alternative functions may be acquired by inputting the at least two second drop depth data respectively to the S alternative functions.

A difference between the fourth brightness value and the third ambient brightness value under the predetermined ambient light may be determined.

An alternative function with an output differing the least from the difference may be determined as the brightness adjusting model.

S brightness adjusting models each including a preset power and a corresponding coefficient may be preset as the alternative functions. A difference between an output of an alternative function and a true value may be acquired by comparing to a known third ambient brightness value, i.e., the ambient brightness value under the predetermined ambient light. A small difference may indicate a small deviation of a result computed with the current alternative function from a true situation. Accordingly, an alternative function of multiple alternative functions differing the least from the difference may be determined as the brightness adjusting model to acquire a final result of the fitting.

With the S fitting modes, a known input value, i.e., a second drop depth value, may be input to the preset S alternative functions. S respective outputs may be computed with the S preset alternative functions. A true ambient brightness value may be determined under predetermined ambient light. An accurate detection error, i.e., an impact factor of brightness of a display on a result detected by a light sensor, may be determined according to a difference between a true ambient brightness value and a fourth brightness value detected. Accordingly, a brightness adjusting model that determines an impact factor of brightness of a display on a result detected by a light sensor most accurately may be acquired by selecting an alternative function of the S alternative functions with an output value closest to a computed impact factor.

The S alternative functions may have different orders. Different coefficients may be set for different orders. For example, $f_m(x)=ax^m+bx^{m-1}+cx^{m-2}+\ldots$. The m may be the order. Different alternative functions may have different orders. When m=1, an alternative function may be $f_1(x)=ax+b$. When m=2, an alternative function may be $f_2(x)=ax^2+bx+c$. Then, different coefficient values may be set.

Of course, multiple sets of known second drop depth data and differences between corresponding true ambient brightness data and fourth brightness data may be input to alternative functions of different orders to compute corresponding coefficients. Alternative functions of different orders may be verified to determine an order of an alternative function with a minimum error. For example, an order of an alternative function may be set as 2. Coefficients of the alternative function may be a, b, and c, respectively. Namely, $f_2(x)=ax^2+bx+c$. Three sets of data x1, x2, and x3 and corresponding y1, y2, and y3 (differences between known fourth brightness data and the ambient brightness value in a laboratory environment corresponding respectively to second drop depth data x1, x2, and x3) may be input to acquire a set of equations $y1=ax1^2+bx1+c$, $y2=ax2^2+bx2+c$, $y3=ax3^2+bx3+c$. Values of the coefficients a, b, and c may be acquired by solving the set of equations simultaneously, to determine the second-order alternative function. An alternative function of another order may be determined in the same way.

Thus, other inputs may be input to alternative functions of different orders to compute corresponding outputs, and verified through corresponding true ambient brightness, to determine accuracy of the alternative functions of different orders.

In this way, a brightness adjusting model closer to a true impact factor may be determined through multiple fittings, i.e., through function training. The more alternative functions are fitted, the more accurate the result is.

According to one or more embodiments herein, the light sensor may have p light sensing channels. The p may be a positive integer. The first brightness value may include p first brightness values detected by the p light sensing channels. The second brightness value may include p second brightness values detected by the p light sensing channels.

The first drop depth value may be determined according to the first brightness value and the second brightness value as follows.

p brightness differences between the p first brightness values and the p second brightness values detected by the p light sensing channels may be determined respectively according to the first brightness value and the second brightness value.

A weighted average of the p brightness differences may be determined according to the p brightness differences and weighting factors of the p light sensing channels.

The first drop depth value may be determined according to the weighted average.

The light sensor may include a set of sensors with multiple light sensing channels arranged under the display. The ambient brightness value may be obtained using one or more of the light sensors. For example, when multiple light sensors are used, the ambient brightness value may be obtained by averaging detected ambient brightness value from the multiple light sensors. Different light sensing channels may detect brightness data of light of different bands. For example, three light sensing channels Red, Green, and Blue (RGB) may detect brightness data of light in bands of three colors red, green, and blue. Then, the weighting factors may be determined according to ratios of different bands to a full band or a colored-light band. A weighting factor of each band may be less than 1. Weighting factors of all bands may sum to 1. For example, a ratio of three light sensing channels RGB to the colored-light band may be 4:3:3. Then, weighting factors may be 0.4, 0.3, and 0.3.

Accordingly, in aforementioned embodiments, a first brightness value and a second brightness value may be collected as follows. Multiple sets of brightness data may be collected simultaneously by multiple light sensing channels. Then, multiple first drop depths may be computed. Weights of the first drop depths of different bands may be determined according to ratios of bands of different light sensing channels to the full band, degrees of importance of the bands, etc. A first drop depth value corresponding to an overall brightness value may be acquired by computing a weighted average.

Note that in aforementioned embodiments, a third brightness value and a fourth brightness value may be collected through multiple light sensing channels of the light sensor. A second drop depth value may be computed by computing a weighted average. A principle thereof is the same as that of an aforementioned step, which will not be repeated here.

According to one or more embodiments herein, the first brightness value may include n first brightness values relating respectively to n images displayed by the display during the display time window. The second brightness value may include n second brightness values relating respectively to the n images when the display is in the off state during the off time window.

The first drop depth value may be determined according to the first brightness value and the second brightness value as follows.

n brightness differences between the n first brightness values and the n second brightness values may be determined respectively according to the first brightness value and the second brightness value.

The first drop depth value may be determined according to an average of the n brightness differences.

Different first brightness data and second brightness data may be detected when different pictures are displayed at one brightness level of a display. Accordingly, a first drop depth value may be determined as follows. n brightness differences may be acquired by performing detection respectively when a display displays multiple images. The first drop depth value may be determined according to an average of the n brightness differences.

Likewise, a second drop depth value may also be detected as follows. A third brightness value and a fourth brightness value may be detected corresponding respectively to the n images. Then, the second drop depth value may be acquired by computing an average of differences of the n sets of data.

Accordingly, average impact of brightness of a display on a drop depth value may be determined according to an average over different pictures, thereby reducing an error in a drop depth value determined for different pictures.

Figure 3A:
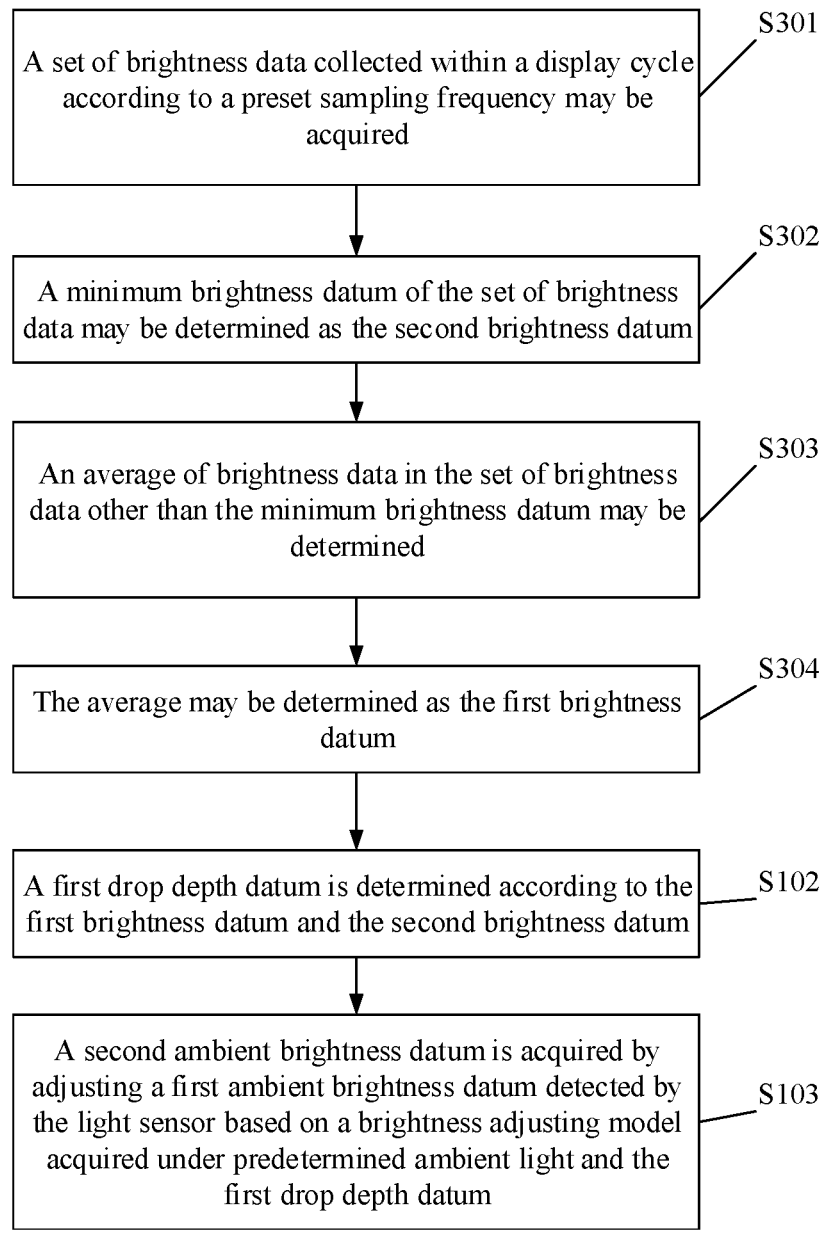
FIG. 3A is a flowchart of a method for detecting ambient light according to an example.

According to one or more embodiments herein, as shown in FIG. 3A, the method may further include a step as follows.

In S301, a set of brightness data collected within a display cycle at a preset sampling frequency may be acquired. The preset sampling frequency may be no less than twice a refreshing frequency corresponding to the display cycle. The display cycle may include the display time window and the off time window.

Here, implementation of collecting a first brightness value and a second brightness value within a display cycle may be provided. According to a sampling theorem, sample data may reserve complete information in a raw signal when a sampling frequency is higher than twice a highest frequency in information of a sampled object. That is, when detection is performed using a frequency higher than twice a refreshing frequency with which a display is refreshed, the first brightness value during display and the second brightness value when the display is off may be acquired.

Figure 3B:
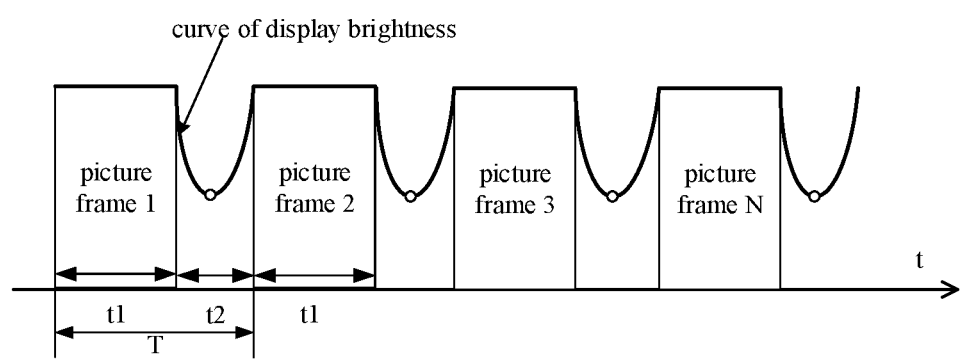
FIG. 3B is a diagram of a display cycle of a display according to an example.

As shown in FIG. 3B, a display may display a frame with a display cycle T. Within a display cycle T, a display time window t1 may be used to display a picture. A pixel may remain being charged. To switch to a next frame, the pixel may be refreshed to discharge the pixel. That is, the display cycle T may further include an off time window t2. Two frames may be switched within t2. Then, within t2, brightness of a pixel of a display may have to be lowered and then raised again to brightness required during the display time window, before the display time window t1 of a next cycle.

A second brightness value relating to an off state of the display during an off time window may be determined as follows.

In S302, a minimum brightness value of the set of brightness data may be determined as the second brightness value.

Since brightness of a display within an off time window of a display cycle is residue brightness of a pixel when it is no longer charged, a second brightness value may be a brightness value corresponding to a minimum brightness value within the display cycle. Accordingly, after a set of sample brightness data are acquired, the second brightness value may be acquired by determining a minimum value of the set.

According to one or more embodiments herein, the first brightness value relating to display performed by the display during the display time window may be determined as follows.

In S303, an average of brightness data in the set of brightness data other than the minimum brightness value may be determined.

In S304, the average may be determined as the first brightness value.

Within the display cycle, a display may display a picture normally in a time window other than when pixels of the display go off in an off time window. Accordingly, a value corresponding to brightness within the time window other than the off time window may be the first brightness value. The first brightness value may be determined as an average of brightness data other than the minimum brightness value. Alternatively, the first brightness value may be determined as a maximum brightness value.

With the method, the first brightness value relating to display performed during the display time window and the second brightness value relating to the off state of a display during the off time window may be acquired by sampling brightness data of the display that is being refreshed at a high rate. Likewise, in aforementioned embodiments, the third brightness value and the fourth brightness value may be determined through the same sampling process. Such a mode is easy to implement. A detection solution in aforementioned embodiments may be implemented by collecting a signal through simple data sampling.

A further example may be provided herein.

Based on a demand for a design of full-screen mobile UE, a component such as a light sensor, a front camera, etc., may have to be arranged under a screen. A light sensor may be arranged under a display. When displaying a picture, the light sensor may collect information on brightness of ambient light through a surface of the display in a dark state of refreshing a pixel in a display gap. With Pulse Width Modulation (PWM) dimming, all pixels may flash at a high frequency higher than that recognizable to naked eyes. A light sensor may collect information on brightness of ambient light in a flashing gap. However, PWM dimming may cause great damage to eyes. DC dimming may reduce damage to eyes.

With DC dimming, a pixel of a display may remain on while displaying a frame. The pixel may stop being charged and go dark in an off time window between the current frame and a next frame before switching to the next frame. However, since electric charge in a pixel for displaying a last frame may remain in a capacitor of the pixel, the dark pixel being refreshed may not reach zero brightness instantly. Instead, brightness of the pixel may be lowered to a level. Upon arrival of data of a next frame, the pixel may once again turn bright.

Accordingly, ambient light collected in an off time window between two frames may still be subject to impact of light emitted by a pixel. Accordingly, with the method herein, brightness of ambient light may be detected accurately by a light sensor under a screen with DC dimming.

A frame sync signal of a drive circuit of a screen may be connected to a circuit interface of a light sensor. Alternatively, a frame sync signal of a drive circuit of a screen may be connected to an interface of a processor. The processor may determine a brightness level parameter of a sample screen based on the frame sync signal. Within a display cycle of data of a frame, brightness data may be collected at least twice to ensure that data collected by a light sensor include at least a brightness value at refreshing corresponding to a frame sync signal and a brightness value relating to normal display when there is no frame sync signal. A difference between the two data collected may be determined. When the screen is refreshed according to the frame sync signal, data of a previous frame may be replaced. The screen may go off for some time. During this time, a pixel may not go dark completely. Instead, brightness thereof may drop to a numerical value, referred to as a drop depth value herein. A display may have different drop depth data at different brightness levels. The lower a brightness level of a display is, the greater is a drop depth. The higher a brightness level of a display is, the less is a drop depth. Accordingly, impact of light emitted by pixels of a display on ambient light detected by a light sensor may be predicted according to a drop depth value corresponding to a brightness level of the display. Therefore, true ambient light data may be acquired by removing an estimated impact factor of light emitted by pixels of a display from a brightness value detected by a light sensor.

Assume that a refreshing frequency of a display is F. Then, a display cycle may be $T=1/F$. Assume that a brightness level of the display at a time point is L. When pixels of the display are scanned row by row, a light sensor under the display may detect a stable brightness value. However, when a last row of pixels are refreshed, the display may acquire a frame sync signal for refreshing. Then, the display may go off for a time t. The display may remain bright for $T1=T-t$. Brightness of the display within the time t may drop.

Assume that a drop depth of a display is H. At different brightness levels, a pixel of the display may glow at different levels, and thus there may be different drop depths H. For example, a display may have brightness levels ranging from 0 to 2,047. Then, there may be 2,047 different drop depths. Depending on the drop depth, impact of a display may have on data detected by a light sensor may differ. Accordingly, an impact value may have to be determined according to a drop depth. Therefore, a true ambient brightness value may be acquired at different brightness levels.

For any drop depth, assume that a light sensor has s light sensing channels, each detecting ambient light of different bands. Data detected by a single light sensing channel may actually be a convolution of a spectral response of the channel and a spectrum of brightness of external ambient light. For example, a light sensor may have three light sensing channels RGB for detecting ambient brightness within three bands RGB, respectively.

A photodiode of a light sensing channel may detect an optical signal. Then, the photodiode may convert optical energy into a current. The current may be amplified by an operational amplifier. Then, the amplified current may be provided to a sampling/holding circuit for charging, and finally converted into binary data by an analog-to-digital converter circuit. The binary data may be stored in a register. A processor may extract the data from the register. The processor may then convert the binary data into a physical quantity of illumination in units of lux using a preset algorithm.

To express a level of drop H of brightness of a display between two frames of data, according to a sampling theorem, a sampling rate F of a light sensor greater than twice a refreshing frequency of the display may ensure that both a numerical value a at a moment of drop (i.e., a minimum value of a set of sampled data) and a numerical value b of brightness of the display within a time window other than the drop time window (i.e., a maximum value, or an average of data other than the minimum value, of the set of sampled data) are collected. b>a. Both a and b may include external ambient brightness and impact of brightness of the display. Accordingly, the drop depth H may be expressed as $C=b-a$.

For a brightness level L of a display, values C acquired by sampling performed by s light sensing channels may correspond to different weighting factors Ts. A weighting factor Ts may be determined by a band corresponding to a light sensing channel, such as to be a ratio of the band to a full band. Accordingly, a drop depth corresponding to the brightness level L of the display may be determined by a formula (1) as follows.

$$Cs = \sum_{i=1}^{s}(T_i * C_i) \tag{1}$$

Alternatively, computation may be performed separately for each light sensing channel. At a brightness level L, a drop depth Cn of a light sensing channel may be determined using n different pictures. The n may be greater than 2.

The drop depth Cs or Cn may correspond to a value f(x) impacting a light sensor. The x may be Cs or Cn. A light sensor may collect a signal by converting an optical signal into an electric signal. Then, the light sensor may amplify and filter the electric signal to form a numerical signal. The numerical signal may be a comprehensive numerical value including impact of both external ambient light and impact of brightness of the display. Accordingly, f(x) may be an impact factor of brightness of the display on ambient brightness detected by the light sensor when the drop depth is x.

A true ambient brightness value may be acquired by adjusting detected ambient brightness according to f(x).

Accordingly, a correspondence between f(x) and x may be fitted to massive data to acquire the function f. Assume that there are n data xi (i=1, 2, 3, . . . , n). If a trained function f(x) has a highest power of m, the function may be $f_m(x) = ax^m + bx^{m-1} + cx^{m-2} + \ldots$.

The training may be as follows. True impact factors $y_{xi}$ may be detected in a predetermined ambient brightness such as a black box environment at brightness levels corresponding respectively to different x. Then, differences between a fitted function $f(x_i)$ and the true impact factors $y_{xi}$ may be computed. Fitting errors $W_m$ may be determined by a formula (2) as follows. The m may be the highest power of f(x).

$$Wm = \sqrt{\frac{(y_{x_1} - f_m(x_1))^2 + \ldots + (y_{x_{i-1}} - f_m(x_{i-1}))^2 + (y_{x_i} - f_m(x_i))^2}{n}} \quad (2)$$

According to the formula (2), there may be m $W_m$. The $W_m$ thus acquired may be sorted to acquire a minimum value. Then, a function $f_m(x_i)$ corresponding to the minimum Wm may be a final function curve fitted.

Figure 4:
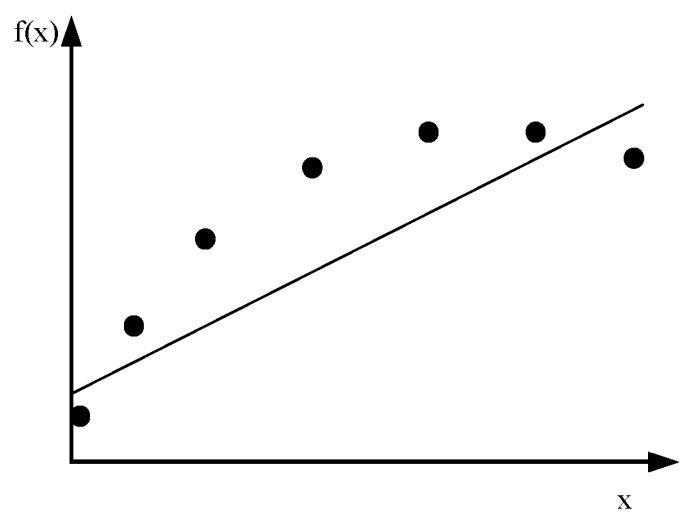
FIG. 4 is a diagram of a result of linear fitting of a brightness adjusting model according to an example.
Figure 5:
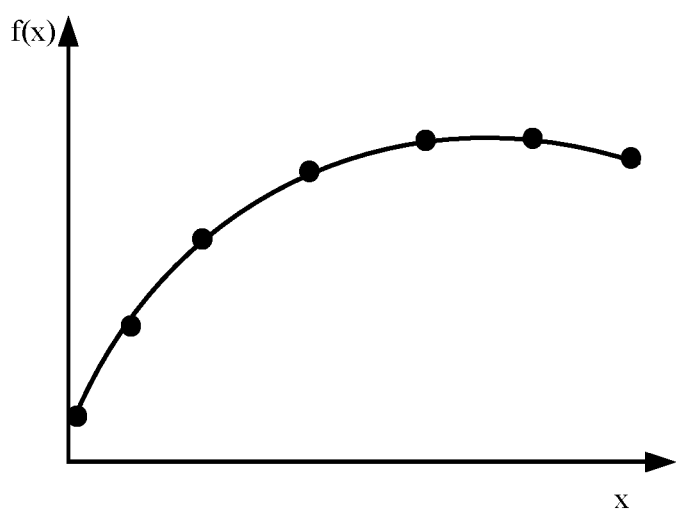
FIG. 5 is a diagram of a result of quadratic fitting of a brightness adjusting model according to an example.
Figure 6:
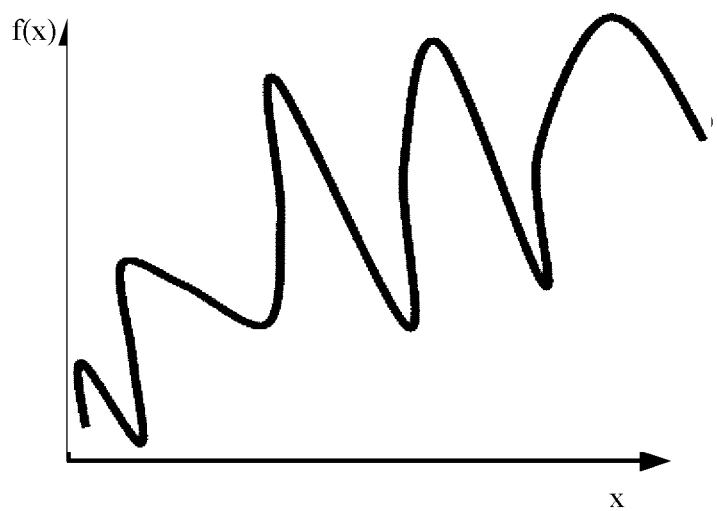
FIG. 6 is a diagram of a result of cubic fitting of a brightness adjusting model according to an example.

A result of the fitting is shown in FIG. 4. The fitting may give a linear function. Data may be distributed around the linear function, which is under-fitted. Namely, the fitted curve does not match a true function relationship thereof. A highest power of the to-be-fitted function may be increased, such that all data values acquired may be distributed on the fitted function curve with a higher power to achieve better fitting, as shown in FIG. 5. If the highest power is increased again, as shown in FIG. 6, although the data are also distributed on the function curve, with improvement of accuracy in detection, when a data point with a higher resolution between two points of the existing data distribution is collected once again, data point off the function curve may emerge, which means the function is over-fitted. This may lead to drastically changing vibration between two data points. Accordingly, the function shown in FIG. 5 is better fitted.

With one or more embodiments herein, a light sensor may be arranged under a display. Ambient brightness may be detected under DC dimming. An accurate ambient brightness value may be acquired by operational data compensation, minimizing interference of brightness of the display to the ambient brightness value.

Figure 7:
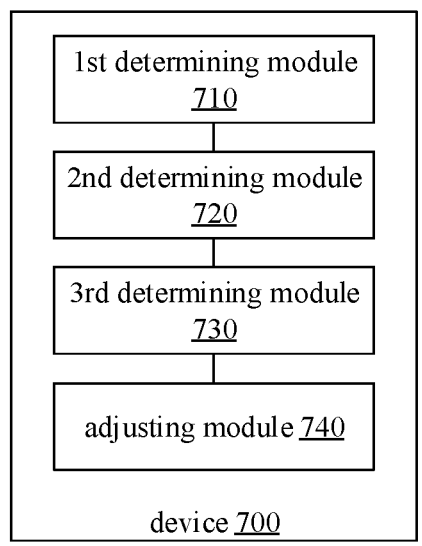
FIG. 7 is a block diagram of a device for detecting ambient light according to an example.

FIG. 7 is a block diagram of a device for detecting ambient light according to an example. Referring to FIG. 7, the device may include a first determining module 710, a second determining module 720, and an adjusting module 740.

The first determining module 710 may be adapted to determining a first brightness value and a second brightness value under current ambient light. The first brightness value relates to display performed by the display during a display time window. The second brightness value relates to an off state of the display during an off time window. The off time window is a time window between two display time windows. The display is off during the off time window.

The second determining module 720 may be adapted to determining a first drop depth value according to the first brightness value and the second brightness value.

The adjusting module 740 may be adapted to acquiring a second ambient brightness value by adjusting a first ambient brightness value detected by the light sensor based on a brightness adjusting model acquired under predetermined ambient light and the first drop depth value.

According to one or more embodiments herein, the device may further include a module as follows.

A third determining module 730 may be adapted to determining, under the predetermined ambient light, a third brightness value and a fourth brightness value. The third brightness value may relate to display performed by the display during the display time window. The fourth brightness value may relate to the off state of the display during the off time window.

A fourth determining module may be adapted to determining a second drop depth value according to the third brightness value and the fourth brightness value.

A fifth determining module may be adapted to determining the brightness adjusting model for adjusting the first ambient brightness value according to the second drop depth value and a third ambient brightness value under the predetermined ambient light.

According to one or more embodiments herein, the display may have M display brightness levels. The M may be a positive integer.

The third determining module 730 may include a first determining sub-module.

The first determining sub-module may be adapted to determining, under the predetermined ambient light, an mth third brightness value and an mth fourth brightness value. The mth third brightness value may relate to display performed by the display at an mth display brightness level during the display time window. The mth fourth brightness value may relate to the off state of the display during the off time window after the display has performed display at the mth display brightness level. The m may be a positive integer no greater than the M.

The fourth determining module may include a second determining sub-module.

The second determining sub-module may be adapted to determining an mth second drop depth value according to the mth third brightness value and the mth fourth brightness value.

The fifth determining module may include a third determining sub-module.

The third determining sub-module may be adapted to determining the brightness adjusting model for adjusting the first ambient brightness value based on a first second drop depth value to an Mth second drop depth value, and the third ambient brightness value under the predetermined ambient light.

According to one or more embodiments herein, the third determining sub-module may be adapted to acquiring the brightness adjusting model by performing data fitting on the first second drop depth value to the Mth second drop depth value, and the third ambient brightness value under the predetermined ambient light.

The adjusting module may include a first inputting sub-module and an adjusting sub-module.

The first inputting sub-module may be adapted to acquiring an adjustment value by inputting the first drop depth value to the brightness adjusting model.

The adjusting sub-module may be adapted to acquiring the second ambient brightness value by adjusting the first ambient brightness value using the adjustment value.

According to one or more embodiments herein, the third determining sub-module may include a sub-module as follows.

A fitting sub-module may be adapted to acquiring S alternative functions for the brightness adjusting model corresponding respectively to S fitting modes by performing, in the S fitting modes, data fitting on at least two second drop depth data of the first second drop depth value to the Mth second drop depth value.

A second inputting sub-module may be adapted to acquiring S outputs output by the S alternative functions by inputting the at least two second drop depth data respectively to the S alternative functions.

A fourth determining sub-module may be adapted to determining a difference between the fourth brightness value and the third ambient brightness value under the predetermined ambient light.

A fifth determining sub-module may be adapted to determining an alternative function with an output differing the least from the difference as the brightness adjusting model.

According to one or more embodiments herein, the light sensor may have p light sensing channels. The p may be a positive integer. The first brightness value may include p first brightness values detected by the p light sensing channels. The second brightness value may include p second brightness values detected by the p light sensing channels.

The second determining module may include a sub-module as follows.

A sixth determining sub-module may be adapted to determining p brightness differences between the p first brightness values and the p second brightness values detected by the p light sensing channels respectively according to the first brightness value and the second brightness value.

A seventh determining sub-module may be adapted to determining a weighted average of the p brightness differences according to the p brightness differences and weighting factors of the p light sensing channels.

An eighth determining sub-module may be adapted to determining the first drop depth value according to the weighted average.

According to one or more embodiments herein, the first brightness value may include n first brightness values relating respectively to n images displayed by the display during the display time window. The second brightness value may include n second brightness values relating respectively to the n images when the display is in the off state during the off time window.

The second determining module may include a sub-module as follows.

A ninth determining sub-module may be adapted to determining n brightness differences between the n first brightness values and the n second brightness values respectively according to the first brightness value and the second brightness value.

A tenth determining sub-module may be adapted to determining the first drop depth value according to an average of the n brightness differences.

According to one or more embodiments herein, the device may further include a first acquiring module.

The first acquiring module may be adapted to acquiring a set of brightness data collected within a display cycle at a preset sampling frequency may be acquired. The preset sampling frequency may be no less than twice a refreshing frequency corresponding to the display cycle. The display cycle may include the display time window and the off time window.

The first determining module may include a second brightness determining sub-module.

The second brightness determining sub-module may be adapted to determining a minimum brightness value of the set of brightness data as the second brightness value.

According to one or more embodiments herein, the first determining module may include a first brightness determining sub-module.

The first brightness determining sub-module may be adapted to determining an average of brightness data in the set of brightness data other than the minimum brightness value, and determining the average as the first brightness value.

A module of the device according to at least one embodiment herein may execute an operation in a mode elaborated in at least one embodiment of the method herein, which will not be repeated here.

According to one or more embodiments herein, a method for detecting ambient light may apply to mobile User Equipment (UE). The mobile UE may include a display and a light sensor. The method includes:

determining a first brightness value and a second brightness value, the first brightness value relating to display performed by the display during a display time window, the second brightness value relating to an off state of the display during an off time window, the off time window being a time window between two display time windows, wherein the display is off during the off time window;

determining a first drop depth value according to the first brightness value and the second brightness value; and acquiring a second ambient brightness value by adjusting a first ambient brightness value detected by the light sensor based on a brightness adjusting model acquired under predetermined ambient light and the first drop depth value.

Figure 8:
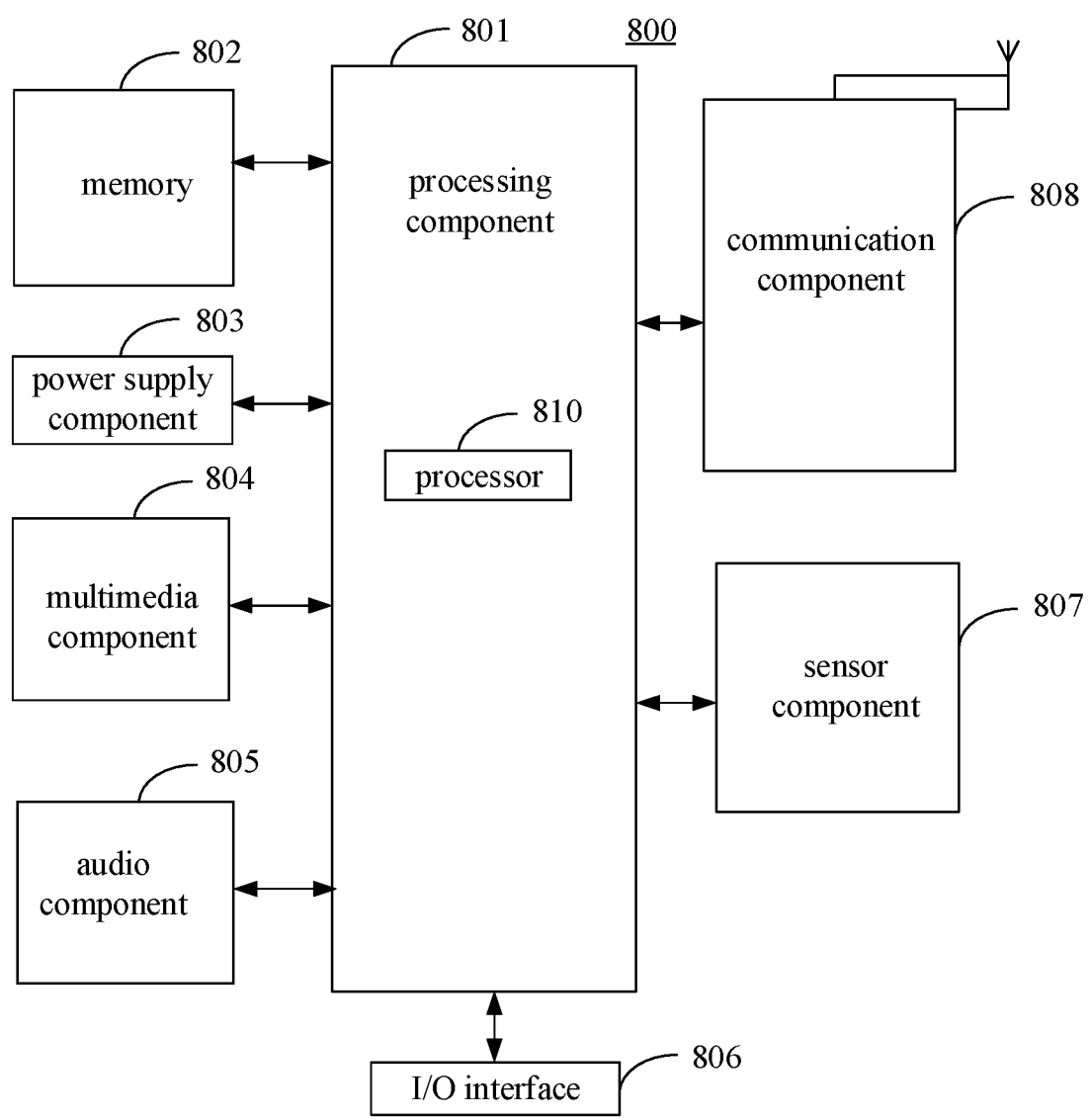
FIG. 8 is a block diagram of a physical structure of a device for detecting ambient light according to an example.

FIG. 8 is a block diagram of a physical structure of a device 800 for detecting ambient light according to an example. For example, the device 800 may be UE such as a mobile phone, a computer, a digital broadcast terminal, messaging equipment, a gaming console, tablet equipment, medical equipment, exercise equipment, a personal digital assistant, etc.

Referring to FIG. 8, the device 800 may include at least one of a processing component 801, memory 802, a power supply component 803, a multimedia component 804, an audio component 805, an Input/Output (I/O) interface 806, a sensor component 807, or a communication component 808.

The processing component 801 may generally control an overall operation of the device 800, such as operations associated with display, a telephone call, data communication, a camera operation, a recording operation, etc. The processing component 801 may include one or more processors 810 to execute instructions so as to complete all or a part of an aforementioned method. In addition, the processing component 801 may include one or more modules to facilitate interaction between the processing component 801 and other components. For example, the processing component 801 may include a multimedia portion to facilitate interaction between the multimedia component 804 and the processing component 801.

The memory 802 may be adapted to storing various types of data to support the operation at the device 800. Examples of such data may include instructions of any application or method adapted to operating on the device 800, contact data, phonebook data, messages, pictures, videos, etc. The memory 802 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 803 may supply electric power to various components of the device 800. The power supply component 803 may include a power management system, one or more power sources, and other components related to generating, managing, and distributing electricity for the device 800.

The multimedia component 804 may include a screen that provides an output interface between the device 800 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 804 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 805 may be adapted to outputting and/or inputting an audio signal. For example, the audio component 805 may include a microphone (MIC). When the device 800 is in an operation mode such as a call mode, a recording mode, a voice recognition mode, etc., the MIC may be adapted to receiving an external audio signal. The received audio signal may be further stored in the memory 802 or may be sent via the communication component 808. The audio component 805 may further include a loudspeaker adapted to outputting the audio signal.

The I/O interface 806 may provide an interface between the processing component 801 and a peripheral interface portion. Such a peripheral interface portion may be a keypad, a click wheel, a button, etc. Such a button may include but is not limited to at least one of a homepage button, a volume button, a start button, or a lock button.

The sensor component 807 may include one or more sensors for assessing various states of the device 800. For example, the sensor component 807 may detect an on/off state of the device 800 and relative positioning of components such as the display and the keypad of the device 800. The sensor component 807 may further detect a change in the position of the device 800 or of a component of the device 800, whether there is contact between the device 800 and a user, the orientation or acceleration/deceleration of the device 800, a change in the temperature of the device 800, etc. The sensor component 807 may include a proximity sensor adapted to detecting existence of a nearby object without physical contact. The sensor component 807 may further include an optical sensor such as a Complementary Metal-Oxide-Semiconductor (CMOS) or a Charge-Coupled-Device (CCD) image sensor used in an imaging application. The sensor component 807 may further include an acceleration sensor, a gyroscope sensor, a magnetic sensor, a pressure sensor, a temperature sensor, etc.

The communication component 808 may be adapted to facilitating wired or wireless communication between the device 800 and other equipment. The device 800 may access a wireless network based on a communication standard such as Wi-Fi, 2G, 3G . . . , or a combination thereof. The communication component 808 may broadcast related information or receive a broadcast signal from an external broadcast management system via a broadcast channel. The communication component 808 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The device 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 802 including instructions, may be provided. The instructions may be executed by the processor 810 of the device 800 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A non-transitory computer-readable storage medium has stored thereon computer-executable instructions which, when executed by a processor of mobile UE, allow the mobile UE to implement any method herein.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments according to the subject disclosure will be apparent to one skilled in the art after he/she has considered the subject disclosure and practiced the invention disclosed herein. The subject application is intended to cover any variation, use, or adaptation of the subject disclosure following the general principle of the subject disclosure and including such departures from the subject disclosure as come within knowledge or customary practice in the art. The subject disclosure and its embodiments are intended to be exemplary only, with a true scope and spirit of the subject disclosure being indicated by the appended claims.

The subject disclosure is not limited to the exact construction that has been described above and illustrated in the accompanying drawings. Various modifications and changes can be made without departing from the scope of the subject disclosure. It is intended that the scope of the subject disclosure be limited only by the appended claims.

What is claimed is:

1. A method for detecting ambient light, the method comprising:
   determining, by a mobile User Equipment (UE) comprising a display and a light sensor, a first brightness value during a display time window and a second brightness value during an off time window, wherein the first brightness value is obtained by the light sensor in a display state of the display during the display time window, the second brightness value is obtained by the light sensor in an off state of the display during the off time window, the display is off during the off time window;
   determining a first drop depth value according to the first brightness value and the second brightness value; and
   acquiring a second ambient brightness value by adjusting a first ambient brightness value detected by the light sensor based on a brightness adjusting model acquired under predetermined ambient light and the first drop depth value,
   wherein the brightness adjusting model is acquired under the predetermined ambient light by:
   determining, under the predetermined ambient light, a third brightness value and a fourth brightness value, the third brightness value relating to display performed by the display during the display time window, the fourth brightness value relating to the off state of the display during the off time window;
   determining a second drop depth value according to the third brightness value and the fourth brightness value; and
   determining the brightness adjusting model for adjusting the first ambient brightness value according to the second drop depth value and a third ambient brightness value under the predetermined ambient light.

2. The method of claim 1, wherein the display has M display brightness levels, wherein the M is a positive integer,
   wherein the determining, under the predetermined ambient light, the third brightness value and the fourth brightness value comprises:
   determining, under the predetermined ambient light, an mth third brightness value and an mth fourth brightness value, the mth third brightness value relating to display performed by the display at an mth display brightness level during the display time window, the mth fourth brightness value relating to the off state of the display during the off time window after the display has performed display at the mth display brightness level, the m being a positive integer no greater than the M,
   wherein the determining the second drop depth value according to the third brightness value and the fourth brightness value comprises:
   determining an mth second drop depth value according to the mth third brightness value and the mth fourth brightness value,
   wherein the determining the brightness adjusting model for adjusting the first ambient brightness value according to the second drop depth value and the third ambient brightness value under the predetermined ambient light comprises:
   determining the brightness adjusting model for adjusting the first ambient brightness value based on a first second drop depth value to an Mth second drop depth value, and the third ambient brightness value under the predetermined ambient light.

3. The method of claim 2, wherein the determining the brightness adjusting model for adjusting the first ambient brightness value based on the first second drop depth value to the Mth second drop depth value, and the third ambient brightness value under the predetermined ambient light comprises:
   acquiring the brightness adjusting model by performing data fitting on the first second drop depth value to the Mth second drop depth value, and the third ambient brightness value under the predetermined ambient light,
   wherein the acquiring the second ambient brightness value by adjusting the first ambient brightness value detected by the light sensor based on the brightness adjusting model acquired under the predetermined ambient light and the first drop depth value comprises:
   acquiring an adjustment value by inputting the first drop depth value to the brightness adjusting model; and
   acquiring the second ambient brightness value by adjusting the first ambient brightness value using the adjustment value.

4. The method of claim 3, wherein the acquiring the brightness adjusting model by performing data fitting on the first second drop depth value to the Mth second drop depth value, and the third ambient brightness value under the predetermined ambient light comprises:
   acquiring S alternative functions for the brightness adjusting model corresponding respectively to S fitting modes by performing, in the S fitting modes, data fitting on at least two second drop depth data of the first second drop depth value to the Mth second drop depth value;
   acquiring S outputs output by the S alternative functions by inputting the at least two second drop depth data respectively to the S alternative functions;
   determining a difference between the fourth brightness value and the third ambient brightness value under the predetermined ambient light; and
   determining an alternative function with an output differing the least from the difference as the brightness adjusting model.

5. The method of claim 1, wherein the light sensor has p light sensing channels, wherein the p is a positive integer, wherein the first brightness value comprises p first brightness values detected by the p light sensing channels, wherein the second brightness value comprises p second brightness values detected by the p light sensing channels, wherein the determining the first drop depth value according to the first brightness value and the second brightness value comprises:
   respectively determining p brightness differences between the p first brightness values and the p second brightness values detected by the p light sensing channels according to the first brightness value and the second brightness value;
   determining a weighted average of the p brightness differences according to the p brightness differences and weighting factors of the p light sensing channels; and
   determining the first drop depth value according to the weighted average.

6. The method of claim 1, wherein the first brightness value comprises n first brightness values relating respectively to n images displayed by the display during the display time window, wherein the second brightness value comprises n second brightness values relating respectively to the n images when the display is in the off state during the off time window,
   wherein the determining the first drop depth value according to the first brightness value and the second brightness value comprises:

respectively determining n brightness differences between the n first brightness values and the n second brightness values according to the first brightness value and the second brightness value; and determining the first drop depth value according to an average of the n brightness differences.

7. The method of claim 1, further comprising:

acquiring a set of brightness data collected within a display cycle at a preset sampling frequency, wherein the preset sampling frequency is no less than twice a refreshing frequency corresponding to the display cycle, wherein the display cycle comprises the display time window and the off time window, wherein the determining the second brightness value comprises:

determining a minimum brightness value of the set of brightness data as the second brightness value.

8. The method of claim 7, wherein the determining the first brightness value comprises:

determining an average of brightness data in the set of brightness data other than the minimum brightness value; and determining the average as the first brightness value.

9. The method of claim 1, further comprising:

acquiring a set of brightness data collected within a display cycle at a preset sampling frequency, wherein the preset sampling frequency is no less than twice a refreshing frequency corresponding to the display cycle, wherein the display cycle comprises the display time window and the off time window, wherein the determining the second brightness value comprises:

determining a minimum brightness value of the set of brightness data as the second brightness value.

10. A device for detecting ambient light, the device comprising:

a display and a light sensor; and at least a processor and memory, wherein the memory is adapted to store instructions executable by the processor, wherein the processor is adapted to perform acts comprising:

determining a first brightness value during a display time window and a second brightness value during an off time window, wherein the first brightness value is obtained by the light sensor in a display state of the display during the display time window, the second brightness value is obtained by the light sensor in an off state of the display during the off time window, the display is off during the off time window;

determining a first drop depth value according to the first brightness value and the second brightness value; and acquiring a second ambient brightness value by adjusting a first ambient brightness value detected by the light sensor based on a brightness adjusting model acquired under predetermined ambient light and the first drop depth value, wherein the processor is adapted to acquiring the brightness adjusting model under the predetermined ambient light by performing acts comprising:

determining, under the predetermined ambient light, a third brightness value and a fourth brightness value, the third brightness value relating to display performed by the display during the display time window, the fourth brightness value relating to the off state of the display during the off time window;

determining a second drop depth value according to the third brightness value and the fourth brightness value; and determining the brightness adjusting model for adjusting the first ambient brightness value according to the second drop depth value and a third ambient brightness value under the predetermined ambient light.

11. The device of claim 10, wherein the display has M display brightness levels, wherein the M is a positive integer, wherein the processor is adapted to determining, under the predetermined ambient light, the third brightness value and the fourth brightness value by performing acts comprising:

determining, under the predetermined ambient light, an mth third brightness value and an mth fourth brightness value, the mth third brightness value relating to display performed by the display at an mth display brightness level during the display time window, the mth fourth brightness value relating to the off state of the display during the off time window after the display has performed display at the mth display brightness level, the m being a positive integer no greater than the M, wherein the processor is adapted to determining the second drop depth value according to the third brightness value and the fourth brightness value by:

determining an mth second drop depth value according to the mth third brightness value and the mth fourth brightness value, wherein the processor is adapted to determining the brightness adjusting model for adjusting the first ambient brightness value according to the second drop depth value and the third ambient brightness value under the predetermined ambient light by:

determining the brightness adjusting model for adjusting the first ambient brightness value based on a first second drop depth value to an Mth second drop depth value, and the third ambient brightness value under the predetermined ambient light.

12. The device of claim 11, wherein the processor is adapted to determining the brightness adjusting model for adjusting the first ambient brightness value based on the first second drop depth value to the Mth second drop depth value, and the third ambient brightness value under the predetermined ambient light by performing acts comprising:

acquiring the brightness adjusting model by performing data fitting on the first second drop depth value to the Mth second drop depth value, and the third ambient brightness value under the predetermined ambient light, wherein the processor is adapted to acquiring the second ambient brightness value by adjusting the first ambient brightness value detected by the light sensor based on the brightness adjusting model acquired under the predetermined ambient light and the first drop depth value by:

acquiring an adjustment value by inputting the first drop depth value to the brightness adjusting model; and acquiring the second ambient brightness value by adjusting the first ambient brightness value using the adjustment value.

13. The device of claim 12, wherein the processor is adapted to acquiring the brightness adjusting model by performing data fitting on the first second drop depth value to the Mth second drop depth value, and the third ambient brightness value under the predetermined ambient light by performing acts comprising:

acquiring S alternative functions for the brightness adjusting model corresponding respectively to S fitting modes by performing, in the S fitting modes, data fitting on at least two second drop depth data of the first second drop depth value to the Mth second drop depth value;

acquiring S outputs output by the S alternative functions by inputting the at least two second drop depth data respectively to the S alternative functions;

determining a difference between the fourth brightness value and the third ambient brightness value under the predetermined ambient light; and determining an alternative function with an output differing the least from the difference as the brightness adjusting model.

14. The device of claim 10, wherein the light sensor has p light sensing channels, wherein the p is a positive integer, wherein the first brightness value comprises p first brightness values detected by the p light sensing channels, wherein the second brightness value comprises p second brightness values detected by the p light sensing channels, wherein the processor is adapted to determining the first drop depth value according to the first brightness value and the second brightness value by performing acts comprising:

respectively determining p brightness differences between the p first brightness values and the p second brightness values detected by the p light sensing channels according to the first brightness value and the second brightness value;

determining a weighted average of the p brightness differences according to the p brightness differences and weighting factors of the p light sensing channels; and determining the first drop depth value according to the weighted average.

15. The device of claim 10, wherein the first brightness value comprises n first brightness values relating respectively to n images displayed by the display during the display time window, wherein the second brightness value comprises n second brightness values relating respectively to the n images when the display is in the off state during the off time window, wherein the processor is adapted to determining the first drop depth value according to the first brightness value and the second brightness value by performing acts comprising:

respectively determining n brightness differences between the n first brightness values and the n second brightness values according to the first brightness value and the second brightness value; and determining the first drop depth value according to an average of the n brightness differences.

16. The device of claim 10, wherein the acts further comprise:

acquiring a set of brightness data collected within a display cycle at a preset sampling frequency, wherein the preset sampling frequency is no less than twice a refreshing frequency corresponding to the display cycle, wherein the display cycle comprises the display time window and the off time window, determining a minimum brightness value of the set of brightness data as the second brightness value.

17. The device of claim 16, wherein the processor is adapted to determining the first brightness value by:

determining an average of brightness data in the set of brightness data other than the minimum brightness value; and determining the average as the first brightness value.

18. A non-transitory computer-readable storage medium, having stored thereon computer-executable instructions which, when executed by a processor, cause the processor to perform acts comprising:

determining a first brightness value during a display time window and a second brightness value during an off time window, wherein the first brightness value is obtained by the light sensor in a display state of the display during the display time window, the second brightness value is obtained by the light sensor in an off state of the display during the off time window, the display is off during the off time window;

determining a first drop depth value according to the first brightness value and the second brightness value; and acquiring a second ambient brightness value by adjusting a first ambient brightness value detected by the light sensor based on a brightness adjusting model acquired under predetermined ambient light and the first drop depth value, wherein the brightness adjusting model is acquired under the predetermined ambient light by:

determining, under the predetermined ambient light, a third brightness value and a fourth brightness value, the third brightness value relating to display performed by the display during the display time window, the fourth brightness value relating to the off state of the display during the off time window;

determining a second drop depth value according to the third brightness value and the fourth brightness value; and determining the brightness adjusting model for adjusting the first ambient brightness value according to the second drop depth value and a third ambient brightness value under the predetermined ambient light.

* * * * *